(12) United States Patent
Rolph

(10) Patent No.: US 6,874,373 B1
(45) Date of Patent: Apr. 5, 2005

(54) MASS FLOWMETER HAVING A CONNECTING ELEMENT AND A REINFORCING ELEMENT

(75) Inventor: Chris M. Rolph, Hartwell (GB)

(73) Assignee: Krohne A.G., Basel (CH)

( * ) Notice: Subject to any disclaimer, the term of this patent is extended or adjusted under 35 U.S.C. 154(b) by 28 days.

(21) Appl. No.: 10/621,531

(22) Filed: Jul. 17, 2003

(30) Foreign Application Priority Data

Jul. 22, 2002 (DE) .................................. 102 33 307

(51) Int. Cl.$^7$ .............................................. G01F 1/84

(52) U.S. Cl. ............................................. 73/861.357

(58) Field of Search ................... 73/861.357, 861.356, 73/861.355, 288.1; 285/329, 368, 354; 228/131

(56) References Cited

U.S. PATENT DOCUMENTS 6,168,069 B1 * 1/2001 Lorenz ....................... 228/131
6,523,421 B1 * 2/2003 Tanner et al. ........... 73/861.357

* cited by examiner

*Primary Examiner*—Harshad Patel
(74) *Attorney, Agent, or Firm*—Cesari and McKenna, LLP

(57) ABSTRACT

A mass flowmeter that operates by the Coriolis principle and incorporates an enclosure, a Coriolis line and a connection that connects the mass flowmeter to a port of a pipeline system. The connection includes a connecting element and a separate mounting element, the connecting element is welded to one end of the Coriolis line while also serving to establish a conductive connection between the Coriolis line and the pipeline system via the port of the pipeline system, and the mounting element is firmly attached to the enclosure of the mass flowmeter while securing the mass flowmeter to the port of the pipeline system, the above thus constituting an easy-to-manufacture food-handling connection system for a mass flowmeter.

8 Claims, 2 Drawing Sheets

MASS FLOWMETER HAVING A CONNECTING ELEMENT AND A REINFORCING ELEMENT

BACKGROUND OF THE INVENTION

This invention relates to a Coriolis-type mass flowmeter with an enclosure, a Coriolis line and a connection for connecting the mass flowmeter to the ports of a pipeline system.

1. Field of the Invention

Mass flowmeters of the type referred to above are used in a variety of technical applications in which it is important not only to precisely determine the volumetric flow rate but also to obtain information as to the mass of the medium that has passed through the mass flowmeter. Requirements of that nature exist for instance in the food industry, typically involving flow-rate measurements of liquids and pasty substances such as liquid sugars, fruit juices, sodas, dairy cream, egg yolk, ice cream etc. Flow-rate measurements of these substances and other foods must be made under conditions that meet specific hygiene-related standards to avoid contamination and spoilage of these foods, especially by bacterial infection which, after human consumption, could pose serious health hazards.

It follows that in flow-rate measuring operations involving foods, the connection of the mass flowmeter and the pipeline ports to which the mass flowmeter is connected must meet particularly stringent requirements. Apart from certain material specifications, specific gap sizes must be used to ensure that the product can pass through the mass flowmeter in altogether hygienic fashion.

2. Description of the Prior Art

The connectors used heretofore are generally referred to as food-handling clamps or sanitary clamps. There are many such connections on the market, from "Tri-Clamps" to DIN 11851/SC threaded unions, IDF/ISS screw clamps, RIT screw couplings and the IDF clamps commonly used in Japan.

Given the large variety of sanitary connections, building a mass flowmeter for use in the food industry faces a problem in that the mass flowmeter must be equipped with whatever different type of connection has been specified by the customer concerned. To meet that requirement, a certain modularity has been achieved by means of adapters that provide the necessary adaptation to the connection employed in each individual case. That, however, involves complexities in design and mechanical implementation while also necessitating additional seals with a correspondingly greater chance of leakage.

SUMMARY OF THE INVENTION

It is therefore the objective of this invention to introduce a Coriolis-type mass flowmeter that can be produced in simple fashion for use with a diversity of connections.

For a mass flowmeter of the type referred to above, this objective is achieved by equipping the mass flowmeter with a connection composed of a connecting element and, extending from the latter, a separate mounting element, with the connecting element welded to one end of the Coriolis line and establishing a conductive connection between the Coriolis line and the pipeline system via the port of said pipeline system, while the mounting element is solidly attached to the enclosure of the mass flowmeter and serves to attach the mass flowmeter to the port of the pipeline system.

Thus, according to the invention, both functions to be performed by the connection, i.e. establishing a conductive connection between the Coriolis line and the pipeline system while ensuring the firm attachment of the mass flowmeter to the pipeline system, are accomplished by means of two mutually different components, to wit: a connecting element that is designed to establish a tight connection with the pipeline system, and the mounting element which serves to attach the mass flowmeter to the system. Only the connecting element needs to be attached to the Coriolis line which, according to the invention, is accomplished by welding. Accordingly, the requirements to be met by the material used for the connecting element to ensure a good welded joint with the Coriolis line do not apply to the mounting element. The Coriolis line is often made of titanium so that for a reliable welded joint between the connecting element and the Coriolis line, the connecting element as well is made of titanium. By contrast, according to the invention, there is no need to use titanium for the mounting element which can therefore be produced of a substantially less expensive material such as stainless steel.

The connection between the Coriolis line and the pipeline system can be established in various ways. In a preferred embodiment of the invention, however, the connecting element is mounted onto one end of the Coriolis line and its other, free end is provided with a sealing surface for a sealed connection with the port of the pipeline system. That surface does not itself make direct contact with a matching flat surface on the port of the pipeline system. Instead, a gasket is provided between the two matching surfaces, for instance in the form of an O-ring.

The mounting element can be solidly attached to the enclosure of the mass flowmeter in a number of ways, for instance by welding. In a preferred embodiment of the invention, however, the mounting element is screwed onto the enclosure of the mass flowmeter. To that end, the mounting element may be provided with a female thread which allows it to be screwed onto a male thread on the outside at one end of the enclosure.

For the mass flowmeter referred to above, the objective described is further achieved in that the connection of the mass flowmeter includes a connecting element and a reinforcing element, which reinforcing element is mounted onto one end of the Coriolis line while also being held in place on the enclosure of the mass flowmeter, and the connecting element is welded to the Coriolis line and to the reinforcing element while also serving to establish the conductive connection between the Coriolis line and the pipeline system via the port of the pipeline system.

In other words, according to the invention, one end of the Coriolis line is equipped with a reinforcing element that is welded to the connecting element together with the Coriolis line. This is desirable in view of the fact that, typically, the walls of the Coriolis line are often quite thin, down to below 1 mm, so that without a reinforcing element as provided for by the invention, the end of the Coriolis line could easily be damaged at the point of interconnection during the assembly or operation of the mass flowmeter.

The reinforcing element may be attached directly to the enclosure. In a preferred embodiment of the invention, however, a separate retaining element is provided by way of which the reinforcing element is attached to the enclosure of the mass flowmeter. The advantage of that is, again as pointed out above, that for ensuring a reliable weld connection to a Coriolis line consisting of titanium, the only other element that must also consist of titanium is the reinforcing element. The retaining element, typically significantly larger, may be produced from a less expensive material such as stainless steel.

The retaining element may be attached to the enclosure of the mass flowmeter in a number of ways, for instance by welding. According to a preferred embodiment of the invention, however, the retaining element is screwed onto the enclosure. As in the case of the mounting element described further above, the retaining element is provided with a female thread that allows it to be screwed onto a male thread on the outside of the enclosure of the mass flowmeter. When the retaining element is screwed onto the enclosure, the reinforcing element can be attached to the enclosure by means of the retaining element much in the same way as with a union nut.

The reinforcing element is intended to mechanically reinforce and stress-relieve the Coriolis line when it is attached to the connecting element. Specifically, this can be accomplished in that the reinforcing element completely envelops the Coriolis line over its entire circumference. As an additional bonus, all of the inner surface of the reinforcing element is in contact with the outside surface of the Coriolis line.

BRIEF DESCRIPTION OF THE DRAWINGS

There are a great many ways in which the mass flowmeter according to the invention can be configured and further enhanced. In that context, attention is invited to the dependent claims and to the following description of preferred invention embodiment with reference to the attached drawings, in which:

DESCRIPTION OF THE PREFERED EMBODIMENTS

Figure 1:
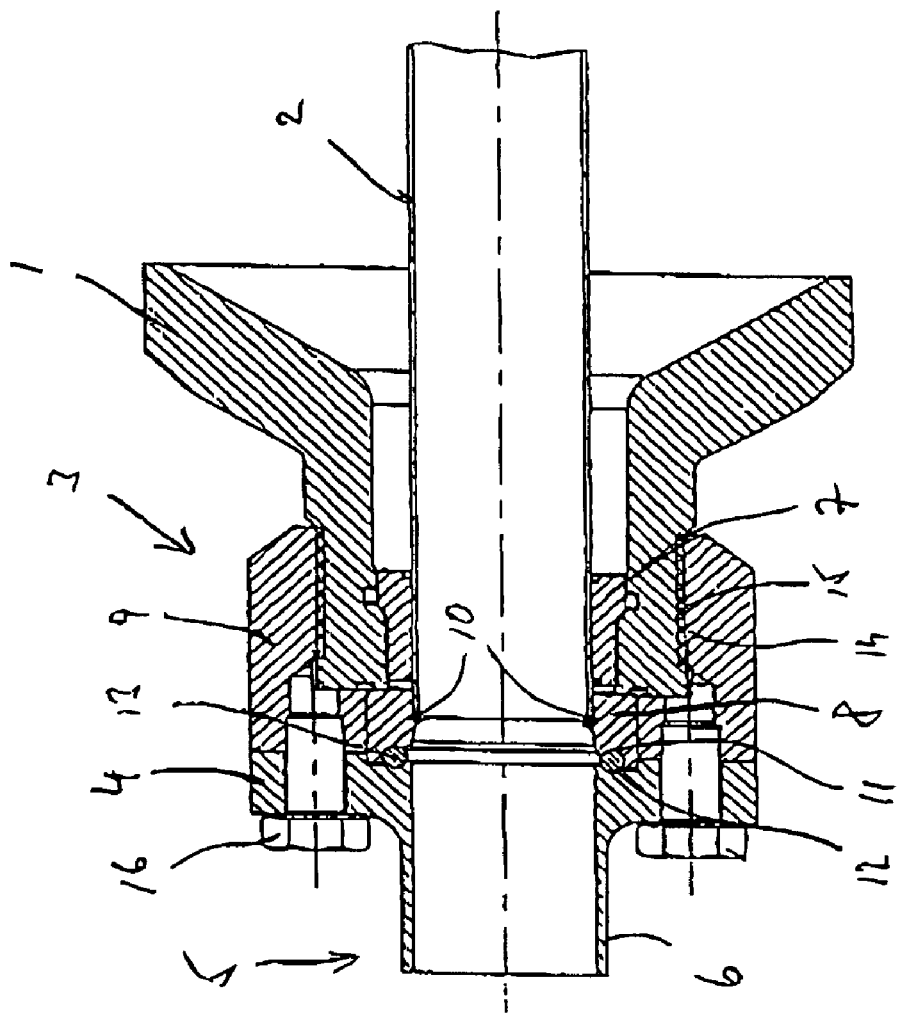
FIG. 1 is a cross-sectional view of the connection of a mass flowmeter according to a first preferred embodiment of the invention to the port of a pipeline system.

The mass flowmeter depicted in FIG. 1, representing the first preferred embodiment of the invention, includes an enclosure 1, a Coriolis line 2 and a connection 3 for connecting the mass flowmeter to the port 4 of a pipeline system 5. Of the pipeline system 5 only one pipe 6 is shown, featuring the port 4 in the form of a flanged fitting to which the mass flowmeter is connected.

On the side of the mass flowmeter, the Coriolis line 2 is attached in the enclosure 1 by way of an intermediate collar 7. The connection 3 of the mass flowmeter is composed of a connecting element 8 and a separate mounting element 9. The connecting element 8 is welded to the depicted end of the Coriolis line 2 as indicated by the welded seam 10. FIG. 1 also shows that the connecting element 8 serves to establish a conductive connection between the mass flowmeter line 2 and the pipeline system 5 via the port 4. To that effect, the connecting element 8 is mounted onto the end of the Coriolis line 2 while featuring on its free side a sealing surface 11 that bears on a matching sealing surface 12 on the port 4 of the pipeline system 5 via an interpositioned gasket-type seal 13. This produces a sealed interface between the pipeline system 5 and the Coriolis line 2 of the mass flowmeter.

This sealed interface is not subjected to any loads by having to support the mass flowmeter. Instead, the mass flowmeter is supported i.e. attached to the port 4 of the pipeline system 5 by means of the mounting element 9 that is provided with a female thread 14 screwed onto a male thread 15 on the outside at one end of the enclosure 1. The mounting element 9 is thus firmly attached to the enclosure 1 of the mass flowmeter, with the actual attachment of the mass flowmeter to the port 4 of the pipeline system 5 implemented in that the mounting element 9 is fastened to the port 4 with machine screws 16.

The connection 3 of the mass flowmeter, consisting of the connecting element 8 and the mounting element 9, thus constitutes a standardized connection that matches the customer's port fitting 4. In the case at hand, however, a secure welded joint between the connecting element 8 and the Coriolis line 2 is provided in that both the connecting element 8 and the Coriolis line 2 are made of titanium. By contrast, as shown in FIG. 1, the mounting element 9, while being of a significantly more complex design involving more material, is made of a less expensive material, i.e. stainless steel. The advantages associated with titanium and important for the properties of the Coriolis line 2 are not needed for the mounting element whose functional requirements as well can be adequately met by stainless steel.

Figure 2:
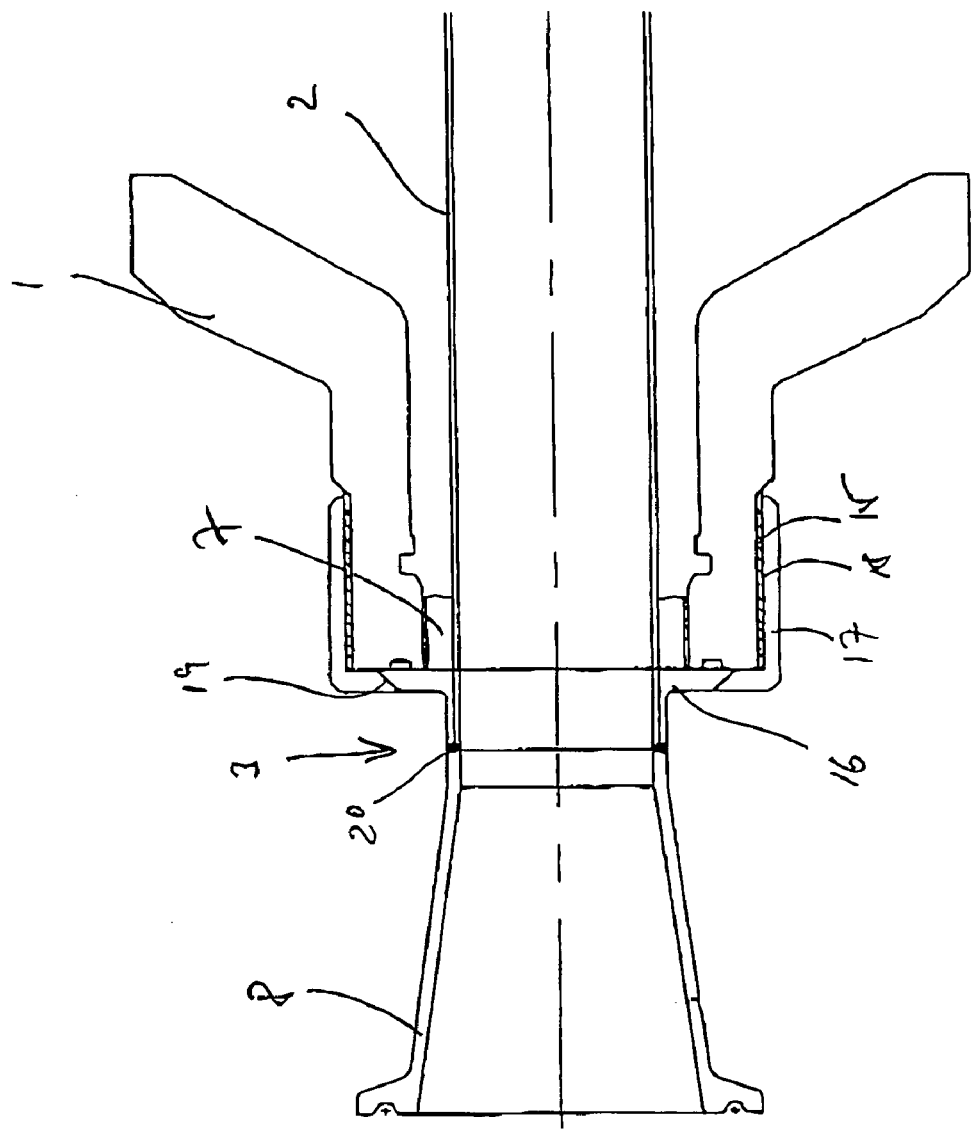
FIG. 2 is a cross-sectional view of the connection of a mass flowmeter according to a second preferred embodiment of the invention.

The mass flowmeter, partially illustrated in FIG. 2 and representing the second preferred embodiment of the invention, again includes an enclosure 1, a Coriolis line 2 and a connection 3 with a connecting element 8 for connecting the mass flowmeter to the port, not illustrated, of a pipeline system. The shape of the connecting element 8 corresponds at its free end to a standard connector, in this case a Tri-Clamp system.

In this second preferred embodiment of the invention, the connection 3 of the mass flowmeter encompasses a reinforcing element 16 in addition to the connecting element 8 that serves to establish a conductive connection between the Coriolis line 2 and the pipeline system via the port of the latter. The reinforcing element 16 is mounted on the depicted end of the Coriolis line 2 and attached to the enclosure of the mass flowmeter by means of a retaining element 17. The retaining element 17 is provided with a female thread 18 screwed onto a male thread 15 on the enclosure 1. By virtue of a tapered recess 19 in the forward part of the retaining element 17 and a corresponding shape of the reinforcing element 16, that reinforcing element 16 is clamped against the enclosure 1 when the retaining element 17 is screwed on. To perform its function in securing and reinforcing the Coriolis line 2, the reinforcing element 16 completely envelops the Coriolis line 2 over its entire circumference and its inner surface makes full contact with the outside of the Coriolis line 2.

The reinforcing element 16 serves to protect and reinforce the Coriolis line 2 and is welded, together with the Coriolis line 2, to the connecting element 8 as indicated by a common welded seam 20. Here again, as in the case of the first preferred embodiment, the material used for the retaining element 17 may be different from that of the Coriolis line 2 and the reinforcing element 16. Specifically, when the Coriolis line 2 is made of titanium, the retaining element 17 does not also have to consist of titanium since the retaining element 17 is not intended to be welded to the Coriolis line 2.

What is claimed is:

1. A mass flowmeter, with an enclosure, a Coriolis line and a connection for connecting the mass flowmeter to a port of a pipeline system, wherein said connection includes a connecting element and a reinforcing element, the reinforcing element is mounted on one end of the Coriolis line and is attached to the enclosure of the mass flowmeter, the connecting element is welded to the Coriolis line and to the reinforcing element while also serving to establish a conductive connection between the Coriolis line and the pipeline system via a port of the pipeline system, wherein separate from the connecting element, a retaining element is provided by means of which the reinforcing element is attached to the enclosure of the mass flowmeter.

2. The mass flowmeter as in claim 1, wherein the retaining element is screwed onto the enclosure.

3. The mass flowmeter as in claim 2, wherein the reinforcing element is clamped onto the enclosure by means of the retaining element.

4. The mass flowmeter as in one of the claims 1, 2 and 3, wherein the retaining element consists of a different material from the reinforcing element.

5. The mass flowmeter as in one of the claims 1, 2 and 3, wherein the connecting element and/or the reinforcing element consist(s) of the same material as the Coriolis line, that material preferably being titanium.

6. The mass flowmeter as in one of the claims 1, 2 and 3, wherein the reinforcing element completely surrounds the Coriolis line over its entire circumference.

7. The mass flowmeter as in one of the claims 1, 2 and 3, wherein the inner surface of the reinforcing element is in full contact with the outside surface of the Coriolis line.

8. The mass flowmeter as in claims 1, 2, and 3, wherein the connection of the mass flowmeter and the port of the pipeline system are designed as food-handling connection systems.

* * * * *